March 3, 1964     T. A. AUSTIN     3,123,126
AUTO TIRE BEAD BREAKER
Filed Nov. 15, 1962
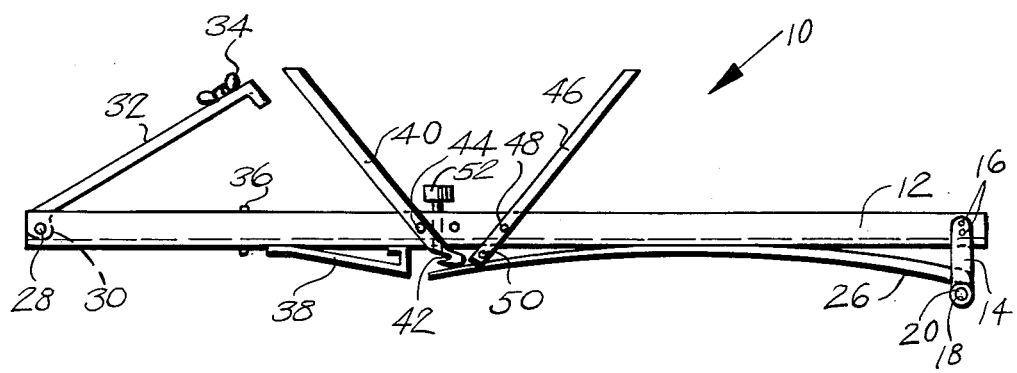
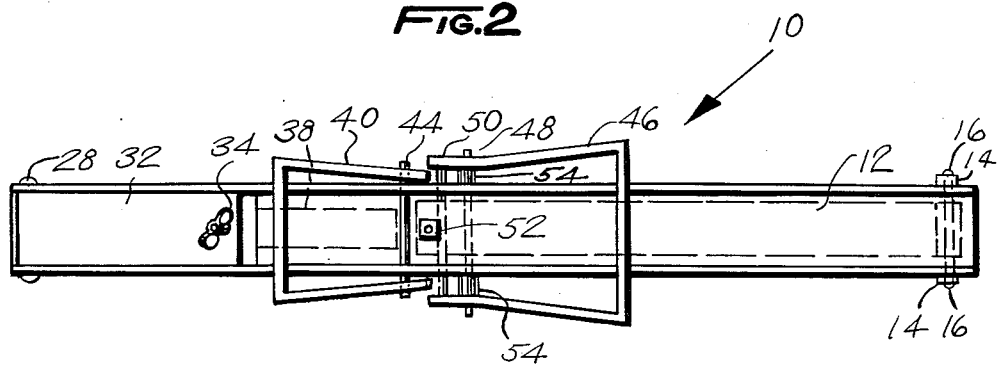
INVENTOR.
*Thomas A. Austin*

United States Patent Office 3,123,126
Patented Mar. 3, 1964

3,123,126
AUTO TIRE BEAD BREAKER
Thomas A. Austin, Mill Valley Road, Belchertown, Mass.
Filed Nov. 15, 1962, Ser. No. 237,944
8 Claims. (Cl. 157—1.17)

This invention relates to hand tools and more particularly to a hand tool for breaking an automobile tire bead, from the wheel rim.

It is an object of the present invention to provide an automobile tire bead breaker which will break the bead away from the wheel rim with a minimum of effort and in a minimum amount of time.

Another object of the present invention is to provide a tire bead breaker which will have a tongue that will actually get in between the rim and bead of the tire thus facilitating separation of the bead from the rim.

A further object of the present invention is to provide a tire bead breaker which will be of such small size as to be folded and placed into an automobile trunk without taking up too much space and will have a tool compartment contained within.

Other objects of the invention are to provide a tire bead breaker bearing the above objects in mind which is of simple construction, has a minimum number of parts, is inexpensive to manufacture and efficient in operation.

For other objects and for a better understanding of the invention reference may be had to the following detailed description taken in conjunction with the accompanying drawing, in which:

FIGURE 1 is a side view of a tire bead breaker comprising the present invention;

FIGURE 2 is a top plan view of FIGURE 1; and

FIGURE 3 is an enlarged side view of the tongue shown removed from the invention.

Referring now more in detail to the drawing, a tire bead breaker tool 10 made in accordance with the present invention is shown to include an elongated frame 12 of rectangular and U-shaped configuration having a pair of parallelly spaced apart bars 14 at one end which are secured externally of the sides by a plurality of rivets 16. An opening in the downward end of bars 14 receives a pin 20 which is fixedly secured in openings 18. Pin 20 is freely and rotatably received within opening 22 of bushing 24 thus providing pivot means for tongue 26 which is of an elongated configuration. An elongated pivot pin 28 is received through the opposite side of frame 12 and is parallel wtih pivot pin 20. Pivot pin 28 provides securement means through lips 30 of L-shaped configurated tool cover 32. Cover 32 provides a means for containing necessary tools for removing a tire from the wheel rim and is provided with a wing nut 34 which threadingly receives stud 36. Stud 36 extends vertically through the bottom of frame 12 and is fixedly secured to it. An angular bracket 38 is fixedly secured beneath frame 12. A U-shaped locking lever 40 having a pair of notches 42 at its lower end is pivotable about pivot pin 44 secured to frame 12. A U-shaped configurated suppression 46 is pivotable around pivot pin 48 received through frame 12 and is provided with a cam bar 50 which is received in sliding engagement with the end of tongue 26. A threaded bolt 52 is threaded through the bottom of frame 12 and when urged threadingly downward against the tongue 26 provides a means for breaking the bead of the tire from the rim of the wheel.

A pair of spacers 54 of circular configuration are freely and rotatably received on pivot pin 48 externally of frame 12.

In operation, the mechanic lightly drives the tongue 26 between the bead of the tire and the rim of the wheel. Then he presses frame 12 down on top of the wheel and holds it there in position with his left foot. The stop 38 on bottom of tool will then be behind wheel rim, after which, with his left hand he then moves the outside locking lever 40 toward the right. This will lock notches 42 around the edge of the rim. He will then pivot the suppression lever 46 back to the left. The cam bar 50 in the end of lever 40 will then roll on the curvature of tongue 26 causing the lever to press downward on the bead of the tire. When the gap attained is sufficient between the rim and the bead aluminum wedges are then placed there to hold the advantage gained while the tool is then moved three or four inches to a new position where the herein described procedure is repeated.

If the bead of the tire is exceptionally hard to remove from the rim the bolt 52 may be rotated so that it bears down on the tongue 26 until the bead breaks away from the rim.

It shall thus be recognized that the suppression lever 46 may be removed entirely from tool 10 and the bolt 52 may be used only for breaking the bead away from the tire.

It shall be noted that when tool 10 is in use the mechanic's foot may be placed on top of the frame 12 thus further aiding in holding it in place.

It shall further be noted that tool storage means is provided within frame 12 by cover 32 which may be secured in place thus retaining the tools within by the wing nut 34 being threadingly received on the stud 36.

While various changes may be made in the detail construction it shall be understood that such changes shall be within the spirit and scope of the present invention as defined by the appended claims.

What I claim as new and desire to protect by Letters Patent of the United States is:

1. An automobile tire bead breaker tool comprising, in combination, a substantially elongated frame, a pair of parallel bars carried by said frame, a substantially arcuate and elongated tongue carried by said frame providing a means for insertion between the bead and the rim of an automobile tire, a substantially angular bracket, a substantially U-shaped suppression lever, a cam bar carried by said frame providing a means for urging against said tongue, a substantially U-shaped locking lever carried by said frame providing a means for gripping said frame, a threaded bolt carried by said frame providing a means for urging against said tongue for breaking difficult beads from the rim, a pivotable and substantially L-shaped cover with wing nut means and pin means providing a means for storage of tools within said frame of said tool.

2. A combination according to claim 1, wherein one end of said frame is provided with a pivot pin receiving a pair of parallel lips of said cover, said cover forming box means within said U-shaped frame of said tool when closed for tools and securement of said cover is provided for by stud means in the bottom of said frame of said tool and wing nut means externally of said cover.

3. A combination according to claim 2, wherein the end of said frame of said tool opposite said cover end is provided with said parallel bars and said parallel bars extend downward and freely and rotatably receive a bushing between said bars, said bushing providing retaining means for said arcuate and substantially tapered tongue secured to said bushing and said tongue provides a means for insertion of said tool between the rim of said wheel and the bead of said tire.

4. A combination according to claim 3, wherein said U-shaped suppression lever provides camming means against said tongue by said cam bar below said frame and said suppression lever is pivotable upon the pivot pins received through said frame and through said suppression lever.

5. A combination according to claim 4, wherein a secondary means for urging against said tongue is provided for by a substantially elongated and threaded bolt through the bottom of said frame of said tool and said bolt when rotated clockwise urges downward against said tongue particularly for breaking the bead that is hard to break away from said rim of said tire.

6. A combination according to claim 5, wherein said U-shaped locking lever is provided with pivot means received through its lower end and through said frame's side walls and the lowermost end of said locking lever is provided with angular notches for engagement with said bead of said tire and said bracket of substantially angular configuration provides stop means on said tire behind said rim.

7. A combination according to claim 6, wherein operation of said tool comprises insertion of said tongue between said bead at a point of said rim of said tire and said tongue is lightly driven between said bead and said rim of said wheel and said frame of said tool is pressed downward on top of said wheel and held there by the operator's left foot and said operator with his left hand pivots said locking lever towards the right of said tool and said notches in said lever will engage the edge of said rim and then said operator brings said suppression lever back towards the left.

8. A combination according to claim 7, wherein said cam bar on the end of said suppression lever rolls on the surface of said tongue causing the said lever to press downward on said bead of said tire and when the gap between said bead and said rim of said wheel is sufficient aluminum wedges are placed there to hold said gap while said tool is moved to another position on said tire wherein the procedure is then repeated and when tool is in use the foot of said operator may be placed on top of said frame holding it in place.

References Cited in the file of this patent
UNITED STATES PATENTS

| | | |
|---|---|---|
| 2,316,023 | Sauer | Apr. 6, 1943 |
| 2,640,528 | Caldwell | June 2, 1958 |